United States Patent [19]

Tsai

[11] Patent Number: 4,673,696

[45] Date of Patent: Jun. 16, 1987

[54] THERMOSET MOLDING COMPOSITIONS

[75] Inventor: Chung-Chieh Tsai, Dublin, Ohio

[73] Assignee: Ashland Oil, Inc., Russell, Ky.

[21] Appl. No.: 881,640

[22] Filed: Jul. 3, 1986

[51] Int. Cl.$^4$ ............................................. C08G 18/14
[52] U.S. Cl. .................................... 521/172; 252/182; 521/173; 521/174; 521/176; 528/49; 528/75
[58] Field of Search ............... 521/172, 173, 174, 176; 528/49, 75; 252/182

[56] References Cited

U.S. PATENT DOCUMENTS

| | | | |
|---|---|---|---|
| 3,929,730 | 12/1975 | Graefe et al. | 260/77.5 AN |
| 3,993,576 | 11/1976 | Barron | 252/182 |
| 4,082,634 | 4/1978 | Chang | 428/423 |
| 4,213,837 | 7/1980 | Bristowe et al. | 525/440 |
| 4,220,732 | 9/1980 | McBrayer | 521/167 |
| 4,374,229 | 2/1983 | Dunnavant et al. | 525/28 |
| 4,385,133 | 5/1983 | Alberino et al. | 521/159 |

*Primary Examiner*—Maurice J. Welsh
*Attorney, Agent, or Firm*—Mueller & Smith

[57] ABSTRACT

Disclosed is a storage stable blend of a long chain polyol and a short chain diol wherein the diol is present in an amount whereby the diol and polyol form an incompatible blend. The blend is rendered storage stable by the addition of a compatibilizing amount of an ethylenically unsaturated esterol. Alternatively, the compatibilizing agent comprises an adduct of the ethylenically unsaturated esterol and a polyol, e.g. glycol. The storage stable blends find utility in making rigid, tough RIM parts.

35 Claims, No Drawings

THERMOSET MOLDING COMPOSITIONS

BACKGROUND OF THE INVENTION

The present invention relates to polyol blends such as are used in preparation of polyurethane molded parts and more particularly to the stabilization of such polyol blends and to improved polyurethane thermoset molded parts made therefrom.

Reaction Injection Moldings (RIM) are urethanes basically consisting of a polyol and a polyisocyanate, usually with an extender (e.g. a glycol or a diamine), optionally with a blowing agent (e.g. air), optional reinforcing material (e.g. glass, mica, etc.), wetting agents, and the like, which materials are high pressure injected through a mixing head into a pre-heated mold with usual post-molding baking thereafter applied. RIM urethanes can range from low modulus to very high modulus material parts, foamed on the interior but with a smooth surface. RIM urethanes are capable of being made into very large one-piece parts which are very light in weight. Typical present-day uses of RIM parts include, for example, automobile parts (e.g. bumpers, air deflectors, fenders, front ends, etc.), business machine housings, ski boots, office furniture, and a wide variety of products.

When a glycol extender is utilized in conjunction with a long chain polyol, such as a long chain polyoxyalkylene polyol, it has been reported that the blend suffers from storage stability by separating into two phases. Such phase separation creates difficulties at the plant since mixing of the phase-separated blend must precede use of the blend whether such blend is utilized in RIM part formation or is utilized for other purposes. A variety of proposals aimed at rendering the mixture of long chain polyol and short chain diol compatible have appeared in the art. For example, U.S. Pat. No. 3,929,730 proposes to compatibilize the blend of a polyol and 1,4-butanediol by the addition of thiodiglycol or phenylenediethanolamine. U.S. Pat. No. 3,993,576 proposes to compatibilize mixtures of high molecular weight polyols and low molecular weight polyols by the addition of a butylene glycol or propylene glycol such as dibutylene glycol. U.S. Pat. No. 4,220,732 proposes to compatibilize the blend of polyol and glycol by utilizing as the glycol extender a combination of 1,4-butanediol and phenyldiethanolamine. U.S. Pat. No. 4,385,133 compatibilizes the polyol/glycol blend by employing as the polyol component a mixture of specific polyoxypropylene polyoxyethylene polyols of specific molecular weight and functionality. Other proposals involve the use of salts (potassium chloride or potassium acetate) or add a small amount of isocyanate for partial reaction and compatibilization of the blend.

Despite such advances in the art, need for effectively stabilizing the polyol/glycol blend while improving the final urethane product still is a desire of the art.

BROAD STATEMENT OF THE INVENTION

The present invention is addressed to compatibilizing an incompatible blend of a long chain polyol, such as a long chain polyoxyalkylene polyol, and short chain diol, such as a glycol. Such method comprises incorporating into the blend a stabilizing amount of an esterol containing polymerizable ethylenic unsaturation. Desirably, the hydroxyl functionality and ethylenic unsaturation of the esterol both are pendant.

Another aspect of the present invention is the resulting compatibilized blend of long chain polyol, short chain diol, and stabilizing ethylenically unsaturated esterol. A further aspect of the present invention is an adduct of the ethylenically unsaturated esterol and short chain diol which adduct is compatible with the long chain polyol for forming a single phase blend of low viscosity. The adduct additionally is effective in compatibilizing the blend of long chain polyol and short chain diol. Other aspects of the present invention will readily appear to those skilled in the art based upon the disclosure contained herein.

Advantages of the present invention include the ability to effectively and efficiently compatibilize a blend of polyol and glycol for making a practical storage stable product. Another advantage is the ability to provide a less viscous blend via the formation of an esterol adduct which viscosity improvement enhances flow and wetting of a fiber-mat placed in a mold. Yet another advantage is the increased compatibility of esterol modified polyol blend and isocyanate which is achieved by dint of the esterol. A further advantage is the ability to make tough and rigid thermosets via the simultaneous polymerization of hydroxy/isocyanate funtionality and ethylenic unsaturation functionality. These and other advantages of the present invention will be readily apparent from the description which follows.

DETAILED DESCRIPTION OF THE INVENTION

The three prime ingredients of the compatibilized blend are a long chain polyol, a short chain diol, and a compatibilizing ethylenically unsaturated esterol. Referring initially to the esterol, such esterols contain both hydroxyl functionality and ethylenic unsaturation functionality. The ethylenic unsaturation can be provided by the monomeric esterol itself or can be reacted onto the esterol subsequently by conventional reaction schemes. Conventional reaction schemes react a monomeric alcohol or polyol with, for example, acrylic acids, acrylyl halides, acrylic-terminated ethers, acrylic or methacrylic anhydrides, isocyanate-terminated acrylates, epoxy acrylates, and the like. Further reaction schemes for formulating the unsaturated esterol include reacting a hydroxy-acrylate monomer, hydroxy methacrylate monomer, or an allyl ether alcohol with a cyclic anhydride such as, for example, the anhydrides: maleic, phthalic, succinic, norborene, glutaric, or the like, followed by reaction with alkylene oxide (e.g. ethylene oxide, propylene oxide, or the like). Additional conventional reaction schemes include reacting alpha-aliphatic or aromatic substituted acrylic acids with an oxirane compound.

Alternatively, the unsaturated esterol may simply be a hydroxy acrylate or methacrylate monomer such as, for example, 2-hydroxyethyl acrylate, 2-hydroxyethyl methacrylate, hydroxypropyl acrylate, or the like. Preferably, the unsaturated esterol will be synthesized as disclosed in commonly-assigned U.S. Pat. No. 4,374,229. The U.S. Pat. No. 4,374,229 synthesis involves the catalytically-induced addition reaction of a dicarboxylic acid anhydride with a lower alkylene oxide in the presence of methacrylic acid or acrylic acid as the initiator. Maleic anhydride which constitutes at least the major proportion of dicarboxylic acid anhydride optionally may be isomerized to corresponding fumaric residues or may be left as maleate residues for use as a compatibilizing agent in the present invention. The molecular weight generally will range from about 200 to 800.

Typically, the hydroxy groups of the unsaturated esterol will be pendantly attached. For present purposes, pendant groups include terminal groups. By pendantly attached is meant that the hydroxy groups are attached to the main esterol chain or to a side chain of the esterol. Similarly, the ethylenic unsaturation most often will be pendant unsaturation, typified by vinyl groups, acrylic groups, allyl ether groups, or similar groups provided that such unsaturated groups are subject to addition polymerization cross-linking.

The proportion of compatibilizing ethylenically unsaturated esterol is an amount effective for making the blend of long chain polyol and short chain diol storage stable or phase-stable. Such effective amount typically translates into a weight ratio of esterol to alcohol blend ranging from about 0.3 to 3 and advantageously between about 0.6 and 2. Of course, mixtures of unsaturated esterols may be utilized as is necessary, desirable, or convenient.

An alternative compatibilizing agent comprises an adduct of the unsaturated esterol with a polyol, desirably a glycol. It unexpectedly has been discovered that the viscosity of an unsaturated esterol/glycol and unsaturated esterol/polyol blend can be significantly decreased by the formation of an adduct between the unsaturated esterol and the polyol with which it is blended. Short chain glycols, typified by lower alkylene glycols, are preferred in forming the adduct, though blends of short chain diols and long chain polyols can be used in forming the novel adducts of the present invention. While the adducts conceivably can be made at lower temperatures (e.g. around room temperature), the very protracted times and agitation required make this scheme impractical, especially at commercial operations. Thus, such adducts desirably are obtained by heating, e.g. at about 40°–120° C., the esterol and glycol to obtain at least a partial reaction therebetween (transesterification, isomerization, or other reaction possibly is occurring). Catalysts such as tertiary amines, phosphines, quaternary ammonium or phosphonium salts, inorganic (e.g., tin, magnesium, etc.) hydroxides, titanate esters, and the like and mixtures thereof are optional for the adduct formation. The adducts are a phase stable solution which are less viscous than the physical mixture of the same ingredients. Moreover, such adducts are beneficial for their formation of tough, rigid thermosets. While the precise reaction or reactions occurring during adduct formation has not been completely characterized, likely a mixture between reactants and products of adduct formation result and are defined as the "adduct" for present purposes. Again, a compatibilizing proportion of esterol adduct can be used to compatibilize blends of long chain polyol and short chain diol as described above.

The foregoing description illustrates the presently preferred embodiment of the present invention wherein a long chain polyol and short chain glycol incompatible mixture is compatibilized by an unsaturated esterol. It should be realized that addition of additional long chain polyols to such three-component mixture usually will affect the amount of unsaturated esterol required for compatibilizing the incompatible blend. Thus, the weight ratio noted above is illustrative only and may be required to be adjusted to a significant degree on occasion.

Referring to the incompatible blend of long chain polyol and short chain diol, RIM technology requires levels of short chain diol to be such that the solubility level of the short chain diol in the long chain polyol is exceeded; thus the lack of storage or phase stability. The short chain diols most often are alkylene glycols typically ranging from about 2 to 8 carbon atoms in length. Alternatively, the short chain diols can be polyoxyalkylene glycols resulting from the reaction of an alkylene oxide (e.g. ethylene oxide, propylene oxide, or the like) with a short chain alkylene glycol. The level of short chain diol typically will be in excess of about 5 to 10 percent by weight of the long chain polyol when the resulting blend is intended for use in RIM technology.

Referring to the long chain polyols, such polyols typically are polyoxyalkylene polyols with average molecular weight ranging from between about 1,000 and 20,000 and include diols, triols, tetraols, and the like. The majority of oxyalkylene groups are oxyethylene or oxypropylene groups including mixtures thereof. Additional examples of such long chain polyols can be found in U.S. Pat. Nos. 4,385,133, 3,929,730, 3,993,576, and 4,227,032.

The esterol-compatibilized blend is storage or phase stable which means that the compatibilized blend exhibits single phase characteristics when stored at, for example, room temperature, for a time period of at least three months though typically storage of up to six months may be required. Additionally, the compatibilized blend exhibits thermal stability by exhibiting no significant increase in viscosity when subjected to storage at elevated temperature of, for example, about 100° C. Additionally, the compatibilized blend can be subjected to multiple freeze-thaw cycles and still exhibit single phase characteristics wherein no significant increase of viscosity can be detected. The ability to exhibit single phase characteristics with no significant increase in viscosity renders the compatibilized blend "storage stable" for present purposes. As noted above, the esterol adduct exhibits a lower viscosity than the physical mixture of the reactants from which the esterol adduct is made. Such adducts also are storage stable as defined herein.

Any of the organic polyisocyanates commonly employed in the art of preparing polyurethanes can be employed in forming urethane parts from the compatibilized blend of the present invention. Such polyisocyanates often are polymeric isocyanates in order to reduce toxic vapors of isocyanate monomers. Further, alcohol-modified and other modified isocyanate compositions (e.g. thiocyanates) may be used. Polyisocyanates preferably will have from about 2–4 isocyanate groups per molecule in forming urethane parts. Suitable polyisocyanates for use in the present invention include, for example, hexamethylene diisocyanate, 4,4'-toluene diisocyanate (TDI), diphenylmethane diisocyanate (MDI), polymethyl polyphenyl isocyanate (Polymeric MDI or PAPI), m- and p-phenylene diisocyanates, bitolylene diisocyanate, triphenylmethane triisocyanate, tris-(4-isocyanatophenyl)thiophosphate, cyclohexane diisocyanate (CHDI), bis(isocyanatomethyl)cyclohexane ($H_6XDI$), dicyclohexylmethane diisocyanate ($H_{12}MDI$), trimethylhexane diisocyanate, dimer acid diisocyanate (DDI), dicyclohexylmethane diisocyanate, and dimethyl derivatives thereof, trimethyl hexamethylene diisocyanate, lysine diisocyanate and its methyl ester, isophorone diisocyanate, methyl cyclohexane diisocyanate, 1,5-napthalene diisocyanate, triphenyl methane triisocyanate, xylylene diisocyanate and methyl and hydrogenated derivatives thereof, polymethylene polyphenyl isocyanates, chlorophenylene-2,4-diisocyanate, and the like and mixtures thereof. Aromatic and aliphatic polyisocyanate dimers, trimers, oligomers, polymers (including biuret and isocyanurate derivatives), and isocyanate functional prepolymers often are available as preformed packages and such packages are suitable for use in the present invention also.

The proportion of isocyanate groups to hydroxyl groups in the urethane-forming composition (isocyanate index) typically will range from about 0.8:1 to about 1.2:1, though such ratio can vary as is well known in this art. The two packages or streams which are utilized in forming RIM parts comprise the compatibilized blend as one stream and the polyisocyanate as the second stream. Increased polyol blend/isocyanate compatibility by dint of the esteol improves the molding operation (i.e. mixing of streams, e.g. in the mixing head). Each stream may contain appropriate catalytic amounts of catalysts which promote the reaction between hydroxyl groups and isocyanate groups, as well as catalytic amounts of free-radical initiators which promote the free-radical addition polymerization reaction involving the ethylenic unsaturation of the unsaturated esterols. Urethane-promoting catalysts are well known in the art and include a wide variety of organic and inorganic salts of, and organometallic derivatives of, bismuth, lead, tin, and the like, as well as phosphine and tertiary organic amines. The art cited above contains exemplary lists of such catalysts and should be referred to for a further description thereof. Free-radical polymerization-initiators include, for example, benzoyl peroxide, methyl ethyl ketone peroxide, azo compounds and the like, or metal catalysts (driers) such as cobalt or the like. Promoters useful in this reaction include aromatic amines, metal salts, etc. The proportion of such promoters and catalysts are conventional as those in the art will appreciate, e.g. see Solomon, *The Chemistry of Organic Film Formers*, Robert E. Krieger Publishing Co., Huntington, N.Y. (1977).

Other commonly used additives for RIM products can be applied to the present invention provided that they are inert to the stability and reactivity of the composition. Such additives include, for example, fillers, blowing agents, reinforcing agents, dyes, pigments, moisture scavengers, diluents, surfactants, mold release agents, and the like.

The following examples show how the present invention has been practiced, but should not be construed as limiting. In this application, all units are in the metric system, and all percentages and proportions are by weight, unless otherwise expressly indicated. Also, all citations set forth herein are expressly incorporated here by reference.

EXAMPLES

Example 1

An incompatible mixture of ethylene glycol (59.4 g) and Pluracol TPE 4542 brand polyol (polyether triol, hydroxy no. 36.7, BASF Wyandotte Corp., 39.8 g) was rendered compatible by the addition of the esterol (279 g) of Example 1 of U.S. Pat. No. 4,374,229. The resulting mixture exhibited single phase characteristics, was stable at room temperature, and possessed a Brookfield viscosity of 250 cps at 25° C. A catalyzed version of the compatibilized mixture was formulated by the addition of dibutyltin dilaurate (T-12 brand, M & T Chemical Co., 228 mg) and a cobalt promoter (PEP 183S promoter, Air Products and Chemical Co., 1.6 g).

A polyisocyanate cross-linker was formulated from a modified diphenyl methane diisocyante (Isonate 143L brand, NCO eq. of 144, Upjohn Co., 0.443 mole of NCO groups) and a polymeric diphenylmethane diisocyanate (Mondur MR brand, 31.5% NCO content, Mobay Chemical Corp., 0.895 mole of NCO groups). In a paper cup was mixed 183.3 g (1.34 mole-NCO) of the polyisocyanate blend, 175 g of the catalyzed compatibilized mixture (1.33 mole of OH groups), and 3 g of t-butylperbenzoate. The resulting mixture upon becoming homogeneous was poured into a preheated mold (105° C.). After a few seconds mold time, the mixture solidified and was demolded in 3 minutes.

The molded plaques (3.18 mm thick) exhibited a heat distortion temperature (HDT) of 103° C. (ASTM D-648) and a notched izod impact strength of 0.6 ft-lb/in (ASTM D-256).

Example 2

A comparative formulation was made as in Example 1, except that the incompatible ethylene glycol/Pluracol TPE 4572 polyether triol was omitted. The isocyanate index of 1 was retained as was the polyisocyanate mixture and catalyst/initiator system.

In a paper cup, 265 g of the esterol (0.883 mole OH groups) was mixed with 114 mg of the dibutyltin dilaurate and 0.77 g of the cobalt promoter. To the catalyzed esterol was blended 121 g of the polyisocyanate mixture (0.884 mole NCO groups) and 4.5 g of t-butylperbenzoate.

A plaque, molded in the manner described in Example 1, tested at 91° C. HDT and a 0.2 ft-lb/in notched izod strength. The improvement in performance exhibited by the compatibilized blend is demonstrated.

Examples 3–11

Nine additional incompatible polyol mixtures were rendered compatible by the addition of various esterols, catalyzed, blended with polyisocyanate, cast, and tested as described in Examples 1 and 2. The formulations and test results recorded are set forth below.

TABLE 1(A)

| Composition | EXAMPLE NO. (g) | | | | |
|---|---|---|---|---|---|
| | 3 | 4 | 5 | 6 | 7 |
| Incompatible Polyol Mixtures | | | | | |
| Pluracol TPE 4542 | 30 | 45 | 60 | 22.5 | 28.3 |
| Pluracol 380 | — | — | — | — | — |
| Thanol SF-5505 | — | — | — | — | — |
| Ethylene Glycol | 30 | 30 | 30 | — | 28.3 |
| 1,4-Butane diol | — | — | — | — | — |
| Diethyleneglycol | — | — | — | 45.5 | — |
| Catalyst | | | | | |
| T-12 | — | — | — | — | 0.12 |
| Fomrez UL-24 | 0.12 | 0.12 | 0.12 | 0.12 | — |
| Polycat SA-102 | — | — | — | — | — |
| Promoter | | | | | |
| PEP 183S | 1.95 | 1.95 | 1.95 | 1.97 | 2.0 |
| Compatibilizer | | | | | |
| Esterol 1 | 90 | 75 | 60 | 83.3 | 85 |
| Esterol 2 | — | — | — | — | — |
| Hydroxy propyl methacrylate | — | — | — | — | — |
| Polyisocyanates | | | | | |
| Mondur MR | — | — | — | — | — |

TABLE 1(A)-continued

| Composition | EXAMPLE NO. (g) | | | | |
|---|---|---|---|---|---|
| | 3 | 4 | 5 | 6 | 7 |
| Isonate 143L | — | — | — | — | — |
| Rubinate M | — | — | — | — | — |
| Rubinate MF182 | 177.7 | 171.9 | 166.7 | 158.5 | 158.6 |
| Isocyanate Index | 1.05 | 1.05 | 1.05 | 1.05 | 1.05 |
| Initiator | | | | | |
| t-Butylperbenzoate | 3.03 | 2.93 | 2.84 | 2.7 | 2.9 |
| Molding Temp (°C.) | 115 | 115 | 115 | 115 | 115 |
| Physical Properties | | | | | |
| HDT (°C.) | 91.5 | 95.0 | 90.7 | 89.5 | 101.1 |
| Notched Izod (ft-lb/in) | 1.0 | 1.2 | 1.6 | 1.1 | 1.2 |
| Unnotched Izod (ft-lb/in) | 6.8 | 7.7 | 9.7 | 8.5 | 5.9 |

TABLE 1(B)

| Composition | EXAMPLE NO. (g) | | | |
|---|---|---|---|---|
| | 8 | 9 | 10 | 11 |
| Incompatible Polyol Mixture | | | | |
| Pluracol TPE 4542 | — | — | — | 30.0 |
| Pluracol 380 | — | 36.0 | 19.0 | — |
| Thanol SF 5505 | 18.9 | — | — | — |
| Ethylene glycol | 28.4 | — | 28.5 | 30.0 |
| 1,4-Butane diol | — | 36.0 | — | — |
| Diethylene glycol | — | — | — | — |
| Catalyst | | | | |
| T-12 | 0.14 | 0.14 | 0.11 | — |
| Fomrez UL-24 | — | — | — | — |
| Polycat SA-102 | — | — | — | 0.60 |
| Promoter | | | | |
| PEP 183S | 2.7 | 2.7 | 0.8 | 1.80 |
| Compatibilizer | | | | |
| Esterol 1 | 132.6 | — | 133.7 | — |
| Esterol 2 | — | 132.6 | — | — |
| Hydroxy propyl methacrylate | — | — | — | 60.0 |
| Polyisocyanates | | | | |
| Mondur MR | 189 | — | 184 | — |
| Isonate 143L | — | 206 | — | 218 |
| Rubinate M | — | — | — | — |
| Isocyanate Index | 1.05 | 1.15 | 1.00 | 1.10 |
| Initiator | | | | |
| t-Butylperbenzoate | 3.2 | 3.2 | 3.0 | 3.3 |
| Molding Temp (°C.) | 115 | 100 | 105 | 100 |
| Physical Properties | | | | |
| HDT (°C.) | 100.5 | 88.4 | 110 | 98.7 |
| Notched Izod (ft-lb/in) | 0.7 | 1.2 | 0.69 | 0.82 |
| Unnotched Izod (ft-lb/in) | 5.5 | 6.7 | 5.6 | 4.6 |

Pluracol TPE 4542 polyether triol, see Example 1.
Pluracol 380 polyether triol, OH No. 24.5, BASF Wyandotte Corp.
Thanol SF5505 polyether triol, OH No. 34, Texaco Chemical Co.
T-12 dibutyltin dilaurate, see Example 1.
Fomrez UL-24 organotin catalyst, Witco Chemical Co.
PEP 183S cobalt compound, see Example 1.
Esterol 1, a fumarate esterol, OH No. 186, Arimax 1100 brand, Ashland Chemical Co. (See U.S. Pat. No. 4,374,229)
Esterol 2, a maleate esterol made as in Ex. 1 of U.S. Pat. No. 4,374,229 but not isomerized.
Mondur MR polyisocyanate, see Example 1.
Isonate 143L modified MDI, NCO equivalent of 144, Upjohn Company.
Rubinate M polymeric isocyanate, NCO content of 31.5%, Rubicon Chemical Co.
Rubinate MF-182 polymeric isocyanate, NCO content of 32%, Rubicon Chemical Co.

The esterols rendered compatible the polyol mixtures which were incompatible sans the esterols. As the above-tabulated data demonstrates, the resulting esterol/polyol blend is quite efficacious in forming reaction injection molded urethane parts. Note should be taken that ester/polyol mixture weight ratios of from about 0.6 to 2.8 were evaluated successfully as were three different esterol compatibilizers

Example 12

Another aspect of the present invention is the formation of an adduct of the esterol and one or more of the polyols of the incompatible mixture. The adduct possesses excellent low viscosity and is beneficial in subsequent RIM part formation. The following adducts were synthesized.

Adduct A

A mixture of the esterol of Example 1 (178 g) and ethylene glycol (55.2 g) exhibited a Brookfield viscosity of 168 cps at 25° C. The mixture then was heated at 90° C. for 3 hours to form an adduct having a Brookfield viscosity of 112 cps at 25° C.

Adduct B

A well shaken mixture of the esterol of Adduct A (178 g) and 1,4-butane diol (55.2 g) exhibited a Brookfield viscosity of 290 cps at 25° C. The mixture separated into 2 layers upon standing for 2 hours at room temperature. The phase separated mixture was heated at 90° C. for 3 hours under stirring to form an adduct which was phase stable and had a Brookfield viscosity of 210 cps at 25° C.

Adduct C

A mixture of the esterol of Example 1 (1260 g) and ethylene glycol (742 g) was heated at 90° C. for 3 hours to form an adduct having a Brookfield viscosity of 70 cps at 25° C. and OH No. of 788.

Adduct D

A mixture of 1,4-butane diol (6,382 g), a short chain polyether tetraol (Pluracol PEP 450 polyol, BASF Wyandotte Corp., 1,760 g), Pluracol TPE 4542 polyether triol (2,382 g), the esterol of Example 1 (7,474 g), dibutyltin dilaurate (4.5 g), and PEP 183S cobalt compound (90.8 g) was formed. This mixture had a Brookfield viscosity of 510 cps at 25° C. The mixture then was heated under stirring at 90° C. for 3 hours to make an adduct having a Brookfield viscosity of 250 cps at 25° C.

Example 13

An incompatible mixture of Pluracol 380 polyether triol (30 g), ethylene glycol (22.5 g), and a short chain polyol (Pluracol PEP 450 polyol, OH No. 550, BASF Wyandotte Corp., 15 g) was compatibilized by the addition of Adduct C (81 g). The single-phase product was mixed with 2 drops of T-12 brand dibutyltin dilaurate (about 40 mg) and 7 drops of PEP 183S cobalt compound (about 300 mg). The catalyzed mixture then was mixed with Isonate 143L isocyanate (294 g, 2.03 mole of NCO groups) and t-butylperbenzoate (3.7 g).

The final mixture, after becoming homogeneous, was poured into a preheated mold (90° C.). The molded resin cured in 30 seconds, was demolded, and then postcure baked at 130° 1 C. for 30 minutes. The molded plaque (3.18 mm thick) exhibited a 92.7° C. HDT and 1.2 ft-lb/in notched izod strength.

Example 14

A comparative polyol formulation was made as in Example 13, except that an additional 30 g of ethylene glycol replaced Adduct C. The polyol mixture was blended with Isonate 143L isocyanate (269 g) to yield the same isocyanate index of 1.0 as in Example 13.

The homogenous blend then was molded at 90° C. as in Example 13 including the post-cure bake regimen. The molded plaque (3.18 mm thick) exhibited a 69.3° C. HDT and a 0.2 ft-lb/in notched izod strength.

Example 15

In a paper cup, 144 g of Adduct D (1.48 mole of OH groups) was mixed with 2 drops (ca 20 mg per drop) of T-12 brand dibutyltin dilaurate and 0.76 gm of PEP183S cobalt compound. The catalyzed solution then was blended with Isonate 143L isocyanate (216 g, 1.51 moles of —NCO) and 6.2 g of t-butylperbenzoate. The mixture was stirred vigorously for 15 seconds and then poured into a preheated mold (90° C.). The resin cured in 30 seconds and was post-cure baked at 120° C. for 2 hours. The plaque (3.18 mm thick) gave 94.9° C. HDT, 1.0 ft lb/in notched izod strength, 9.4 ft-lb/in unnotched izod strength, 373,000 psi flexural modulus (ASTM D-790), 10,734 psi tensile strength, and 6.8% tensile elongation (ASTM 412-68).

Example 16

A mixture of 3.7 g of ethylene glycol and 25.4 g of Pluracol TPE4542 polyether triol was compatibilized with 100 g of Adduct A. The single phase solution was mixed with 5 drops (ca 20 mg per drop) of T-12 brand dibutyltin dilaurate and 1.93 g of PEP183S cobalt compound. The catalyzed mixture then was mixed with Rubinate MF-182 isocyanate (160 g, 1.21 moles of —NCO groups) and t-butylperbenzoate (2.72 g). The final mixture was stirred vigorously for 5 seconds and poured into a preheated mold (115° C.). The resin cured in 10 seconds and was demolded in 3 minutes. The plaque (3.18 mm thick) gave 100.2° C. HDT, 1.1 ft lb/in notched izod strength, and 6.0 ft-lb/in unnotched izod strength.

Example 17

A comparative polyol formulation was made as in Example 16 except that an additional 23.7 g ethylene glycol replaced Adduct A. The polyol mixture (incompatible) was mixed with 5 drops of T-12 brand of dibutyltin dilaurate and 1.93 g of PEP183S cobalt compound, and blended with Rubinate MF-182 isocyanate (124.8 g, 0.945 moles of —NCO groups) to yield the same isocyanate index of 1.05 as in Example 16. The blend was stirred vigorously for 5 seconds, resulting in a cloudy mixture which was poured into a preheated mold (115° C.). The resin cured in 30 seconds and was demolded in 3 minutes. The plaque (3.18 mm thick) showed 73.6° C. HDT, 0.4 ft lb/in notched izod strength, and 3.5 ft-lb/in unnotched izod strength.

The results of Examples 13 and 14, and 16 and 17 demonstrate the esterol adduct not only renders the incompatible polyol mixture compatible, but also contributes favorably to the physical properties of the final urethane molded product.

Examples 18 and 19

In a 5-gallon pail, a mixture of 2,514 g of ethylene glycol and 1,688 g of Pluracol TPE 4542 polyether triol was compatibilized by the addition of 11,800 g of Esterol 1. The solution, after mixing with 0.56 phr (parts per hundred parts resin) of PEP 183S cobalt compound and 0.06 phr of T-12 brand dibutyltin dilaurate, was used as stream B in a RIM machine (Accuratio brand). Stream A was a liquid stream of Rubinate M isocyanate with 1.7 phr t-butylperbenzoate. Both streams were maintained at the room temperature. The mold was preheated to 230° F. Streams A and B were brought together and mixed by the RIM machine in an appropriate proportion to achieve an isocyanate index of 1.05. Plaques (3.18 mm thick) were molded with and without glass fiber mats (Owens Corning Fiberglas OCF 8610). Their physical properties are listed in Table 2.

TABLE 2

|  | Ex. 18 | Ex. 19 |
|---|---|---|
| Conditions |  |  |
| Isocyanate Index | 1.05 | 1.05 |
| Glass (OCF-8610) | none | 3 layers |
| Glass content (wt %) | 0 | 31% |
| Post curing | none | none |
| Physical Properties |  |  |
| HDT (°C.) | 97 | 220 |
| Notched Izod (ft lb/in) | 0.52 | 9.2 |
| Unnotched Izod (ft lb/in) | 3.4 | 15.2 |
| Flexural Modulus[1] ($\times 10^5$ psi) | 4.95 | 10.3 |
| Flexural Strength[1] ($\times 10^3$ psi) | 20.6 | 31.4 |
| Tensile Modulus[2] ($\times 10^5$ psi) | 5.03 | 11.5 |
| Tensile Strength[2] ($\times 10^3$ psi) | 11.0 | 21.0 |
| Tensile Elongation[2] (%) | 2.6 | 2.2 |

[1]ASTM D-790
[2]ASM D-412

I claim:

1. A method for making a storage stable blend of a long chain polyol and a short chain diol which blend phase separates under storage, which comprises:
    incorporating into said blend a stabilizing amount of an ethylenically unsaturated esterol.

2. The method of claim 1 wherein the weight ratio of esterol to the polyol/diol blend ranges from about 0.3 to 3.

3. The method of claim 2 wherein said weight ratio ranges from between about 0.6 and 2.

4. The method of claim 1 wherein said esterol contains a pendant hydroxyl group and a pendant ethylencially unsaturated group.

5. The method of claim 1 wherein said esterol contains vinyl unsaturation.

6. The method of claim 5 wherein said esterol is an alkyl hydroxy acrylate or methacrylate monomer.

7. The method of claim 5 wherein said esterol is prepared by the catalytically induced addition reaction of a dicarboxylic acid anhydride selected from the group consisting of maleic anhydride and a mixture of maleic anhydride and phthalic anhydride with a lower alkylene oxide in the presence of methacrylic acid or acrylic acid as the initiator.

8. The method of claim 7 wherein the calculated molecular weight of said esterol ranges from about 200 to 800.

9. The method of claim 1 wherein the proportion of diol in said blend ranges from between about 5 and 95 percent and the proportion of polyol in said blend ranges from between about 95 and 5 percent by weight.

10. The method of claim 1 wherein said polyol comprises a polyoxyalkylene polyol having a molecular weight ranging from between about 1,000 and 20,000.

11. The method of claim 10 wherein said polyol is a triol or tetraol.

12. The method of claim 1 wherein said diol comprises a $C_1$–$C_8$ alkylene glycol.

13. The method of claim 10 wherein said diol comprises a $C_1$–$C_8$ alkylene glycol.

14. The method of claim 1 wherein said ethylenically unsaturated esterol is heated at a temperature of between about 40° and 120° C. with a short chain diol and the resulting adduct is incorporated into said blend in a stabilizing amount.

15. A storage stable blend which comprises:
a long chain polyol, a short chain diol, and an effective amount of an ethylenically unsaturated esterol, said diol present in an amount whereby the diol and polyol form an incompatible blend in the absence of said esterol.

16. The blend of claim 15 wherein the weight ratio of said esterol to said polyol/diol blend ranges from between about 0.3 and 3.

17. The blend of claim 15 wherein said esterol is prepared by the catalytically induced addition reaction of a dicarboxylic acid anhydride selected from the group consisting of maleic anhydride and a mixture of maleic anhydride and phthalic anhydride with a lower alkylene oxide in the presence of methacrylic acid or acrylic acid as the initiator.

18. The blend of claim 17 wherein the calculated molecular weight of said esterol ranges from between about 200 and 800.

19. The blend of claim 15 wherein the proportion of diol in said blend ranges from between about 5 and 95 percent by weight and the proportion of polyol in said blend ranges from between about 95 and 5 percent by weight.

20. The blend of claim 15 wherein said polyol comprises a polyoxyalkylene polyol having a molecular weight of between about 1,000 and 20,000.

21. The blend of claim 15 wherein said diol comprises a $C_1$–$C_8$ alkylene glycol.

22. The blend of claim 15 wherein said ethylenically unsaturated esterol is heated at a temperature of between about 40° and 120° C. with a short chain diol and the resulting adduct is incorporated into said blend in a stabilizing amount.

23. In a process for the preparation of a polyurethane by reaction of an organic polyisocyanate and a blend comprising a long chain polyol and a short chain diol, said blend phase separating under storage, the improvement which comprises incorporating into said blend a stabilizing amount of an ethylenically unsaturated esterol, and using said stabilized blend for forming said polyurethane.

24. The process of claim 23 wherein the weight ratio of said esterol to said polyol/diol blend ranges from between about 0.3 and 3.

25. The process of claim 23 wherein said esterol is prepared by the catalytically induced addition reaction of a dicarboxylic acid anhydride selected from the group consisting of maleic anhydride and a mixture of maleic anhydride and phthalic anhydride with a lower alkylene oxide in the presence of methacrylic acid or acrylic acid as the intiator.

26. The process of claim 25 wherein the calculated molecular weight of said esterol ranges from between about 200 and 800.

27. The process of claim 23 wherein the proportion of diol in said blend ranges from between about 5 and 95 percent by weight and the proportion in said blend ranges from between about 95 and 5 percent by weight.

28. The process of claim 23 wherein said polyol comprises a polyoxyalkylene polyol having a molecular weight of between about 1,000 and 20,000.

29. The process of claim 23 wherein said diol comprises a $C_1$–$C_8$ alkylene glycol.

30. The process of claim 23 wherein said ethylenically unsaturated esterol is heated at a temperature of between about 40° and 120° C. with a short chain diol and the resulting adduct is incorporated into said blend in a stabilizing amount.

31. A polyol adduct useful in the preparation of a polyurethane by reaction with an organic polyisocyanate, which comprises the reaction product of a $C_1$–$C_8$ alkylene glycol and an ethylenically unsaturated esterol at a temperature ranging from between about 40° and 120°, the proportions of esterol and glycol being such that the resultant adduct is storage stable.

32. The adduct of claim 31 wherein said esterol is prepared by the catalytically induced addition reaction of a dicarboxylic acid anhydride selected from the group consisting of maleic anhydride and a mixture of maleic anhydride and phthalic anhydride with a lower alkylene oxide in the presence of methacrylic acid or acrylic acid as the initiator.

33. The adduct of claim 32 wherein the calculated molecular weight of said esterol ranges from between about 200 and 800.

34. The adduct of claim 31 which is blended with a long chain polyol.

35. The adduct of claim 34 wherein said polyol comprises a polyoxyalkylene polyol having a molecular weight of from between about 1,000 and 20,000.

* * * * *